B. B. Herrick & C. W. Wicker.
Post Hole Digger.
Nº 97086.  Patented Nov. 23, 1869.
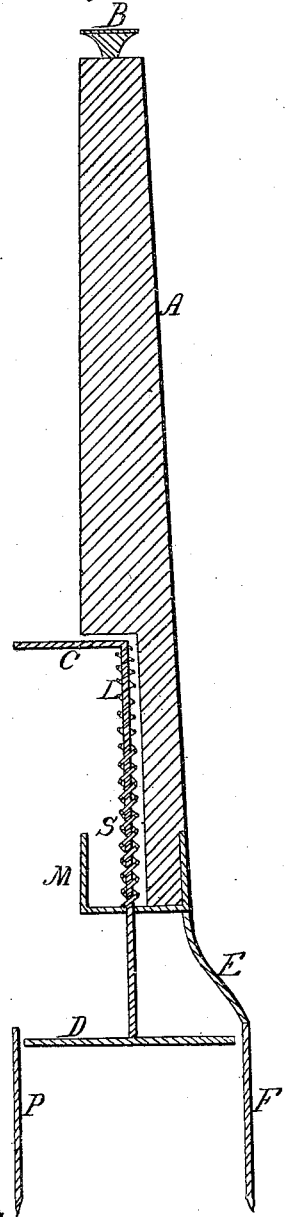
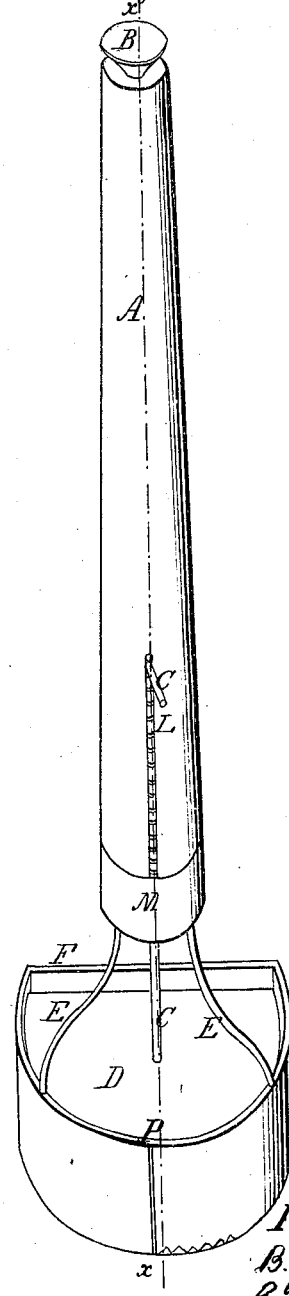
Witnesses
Thos A. Briggs
James White
Inventor
B. B. Herrick
C. W. Wicker
By their Attorney
G. L. Chapin

United States Patent Office.

B. B. HERRICK AND C. W. WICKER, OF DUQUOIN, ILLINOIS.

Letters Patent No. 97,086, dated November 23, 1869.

IMPROVEMENT IN POST-HOLE DIGGERS.

The Schedule referred to in these Letters Patent and making part of the same.

*To all whom it may concern:*

Be it known that we, B. B. HERRICK and C. W. WICKER, of Duquoin, in the county of Perry, and State of Illinois, have invented an Improved Post-Hole Digger; and we do hereby declare that the following is a full, clear, and exact description thereof, which will enable others skilled in the art to make and use the same, reference being had to the accompanying drawings, and letters marked thereon, making a part of this specification, in which—

Figure 1 is a perspective representation of our invention.

Figure 2, a central section of the same, taken on line x x, fig. 1.

The nature of our invention consists in the construction and general arrangement of a device for making post-holes, as more fully hereinafter described.

P F represent a cutter or die, which is made of steel, and so formed as to make holes to suit the shape of posts, which are made by splitting a log through the middle part, and which is permanently fixed to a handle, A, by means of substantial braces E, riveted or welded to it and to a band, M, which is driven tightly on to the said handle.

A plunger, D, is made to fit the inside of the cutter loosely, and has a shank, L, with a projecting arm, C, arranged to operate in a slot made in the handle, a coil-spring, S, being placed around the shank, and having one of its ends bearing against the arm C, and the other end against the band M, forces the plunger D up, after the earth has been expelled from the cutter P F.

*Operation.*

The device may be driven into the ground by a sledge, and raised out by hand, and very greatly facilitate the work for which it is designed, but it is our intention to operate it by horse-or steam-power, thereby providing means for performing a great amount of work in a short space of time.

The advantage of making a hole so nearly as possible to suit the form of a post is obvious, inasmuch as the natural compactness of the earth is much more firm than any loose earth filled in; consequently, if only so much earth is removed as is necessary to receive the post, the latter will be much-less liable to get out of place. This is especially the case when the posts are set in the wet seasons of the year, such as spring and fall.

To fully attain this end, cutters or dies of two or three different sizes can be made to use on one handle, and so arranged as to be readily removed and replaced.

Having thus fully described our invention,

What we claim, and desire to secure by Letters Patent of the United States, is—

The arrangement of the expansive D-shaped cutter F P, plunger D, shaft L, and arm C spring S, with the handle A and band M, all constructed to operate substantially as set forth.

B. B. HERRICK.
C. W. WICKER.

Witnesses:
THOS. BRIGGS,
JAMES WHITE.